3,459,761
MONOHYDRATE OF EQUIMOLECULAR COMPLEX OF ASCORBIC ACID AND PYRIDOXINE BASE
Claude Jeantils, Neuilly-sur-Seine, France, and Etienne Grosclaude, Casablanca-Anfa, and Christian Garlot and Nicolino Petruzzi, Casablanca, Morocco, assignors to Les Laboratoires Dausse, Paris, France, a French body corporate
No Drawing. Filed July 8, 1965, Ser. No. 470,536
Claims priority, application France, July 15, 1964, 981,725
Int. Cl. C07d 99/04; A61k 25/00
U.S. Cl. 260—297.5         4 Claims

ABSTRACT OF THE DISCLOSURE

The monohydrate of the complex between equimolar amounts of ascorbic acid and pyridoxine, is prepared at low temperature in a solvent containing at least sufficient water for the formation of the monohydrate. The substance is crystalline, non-hygroscopic and melts at 84–85° C. The substance may be administered for instance, in tablets or capsules, is more stable than the solution of the complex and is more acceptable to the patient.

---

The present invention relates to the non-hygroscopic crystalline monohydrate of the equimolecular complex of ascorbic acid (vitamin C) and pyridoxine base (vitamin $B_6$) and to dosage forms thereof and procedure for preparing the same.

The equimolecular complex of ascorbic acid and pyridoxine base is known and is used therapeutically. It is in the form of a yellow composition composed of 51.01% of ascorbic acid and 48.99% of pyridoxine base.

The known composition is, however, very strongly hygroscopic and upon exposure to air at ordinary temperature acquires a syrupy consistency which limits its use to liquid pharmaceutical forms, especially drinkable or injectable ampoules which are generally considered to be less convenient and desirable than tablets, capsules and cachets.

In addition, special precautions are necessary to preserve the known complex and failure to do so results in an increase in weight by fixation of the humidity of the air and runs the eventual risk of becoming altered as a result of oxidation of the ascorbic acid content.

By reason of this inconvenience, it has been essential to utilize the drinkable solution of the equimolecular complex of ascorbic acid and pyridoxine base in the form of sealed ampoules each enclosing a single unit dose and not in the form of vials containing a large number of doses and in which the solution will not be protected from the oxygen of the air.

The hygroscopic properties of the equimolecular complex of ascorbic acid and pyridoxine base moreover complicate the preparation of solutions having a particular or desired concentration of the pure composition and it is necessary therefore to carry out manipulations in special rooms where the humidity of the atmosphere is reduced as much as possible.

Now in accordance with the present invention it has been found that the equimolecular complex of ascorbic acid and pyridoxine base can, under certain conditions, fix one molecule of water to give a monohydrate which unexpectedly exists at ordinary temperature in the form of a crystalline non-hygroscopic compound lending itself readily to the formulation of the medicament in solid pharmaceutical forms such as tablets, capsules, cachets, gelules and glutubes. These solid pharmaceutical forms are in general much better accepted by patients than the use of drinkable ampoules.

Besides, the stability and consequently the preservation of the monohydrate of the equimolecular complex of ascorbic acid and pyridoxine base are exceptionally good without it being necessary to take any special precautions. Since the monohydrate complex above referred to is non-hygroscopic, it does not change preceptibly in weight as a function of time and its use is very much simplified for the preparation of exact medicament doses of the active principle. The preparation of solid forms of the medicament is appreciably less expensive as compared with the liquid forms which alone were possible up to the present.

Up until the present time there has not been known any hydrate, either of ascorbic acid or of pyridoxine. When there is taken into consideration the extreme hygroscopicity of the equimolecular complex of ascorbic acid and pyridoxine base, it is highly surprising that it is possible to prepare a crystalline hydrate of the said complex and even more unexpectedly that the hydrate would prove to be non-hygroscopic.

The monohydrate of the equimolecular complex of ascorbic acid and pyridoxine base exists in the form of a very pale yellow powder whose instantaneous melting point is 84–85° C. (bloc Maquenne) and by way of contrast, it is not possible to determine the melting point of the previously known composition because of its syrupy consistency at ordinary temperature.

The new non-hygroscopic monohydrate complex of the present invention is very soluble in water, methanol and dimethylformamide, moderately soluble in absolute alcohol, slightly soluble in acetone and practically insoluble in ethyl ether and chloroform. Its molecular weight is 363.3 and it consists of 48.48% of ascorbic acid, 46.56% of pyridoxine base and 4.96% of water of crystallization.

The above theoretical contents of ascorbic acid and pyridoxine base are confirmed by the titration of the ascorbic acid (iodometry) and the pyridoxine base (spectrophotometry), the confirmatory results of which lead to the conclusion that the new compound contains approximately 96% of the anhydrous complex. Moreover, the calculation of the nitrogen, carbon, hydrogen and oxygen confirms the presence of a molecule of water of crystallization which cannot be determined by the method of Emil Fischer, this latter being inapplicable by reason of the presence of ascorbic acid in the molecule.

The invention comprises furthermore a process for the preparation of the new compound according to which there are made to react at mild temperature ascorbic acid and pyridoxine base in equimolecular proportions, either in water or in an organic solvent such as ethanol in the presence of a quantity of water at least equal to that necessary for the formation of the hydrate. This latter can be crystallized by concentrating the reaction mixture at low temperature and under reduced pressure. The resulting crystals are dried under vacuum at low temperature. Certain variations in procedure are permissible whereby the crystalline compound is filtered off, then washed with a very small quantity of absolute ethyl alcohol and chilled before being dried under vacuum.

The invention is illustrated by the following non-limitative examples.

EXAMPLE I 510.1 grams of ascorbic acid and 489.9 grams of pyridoxine base are dissolved in 1,000 grams of distilled water with gentle heating on a water bath. The solution is filtered and then concentrated under vacuum of 40 mm. of mercury at a temperature equal to or below 40° C. until approximately 80% of the water is evaporated. The resulting product is refrigerated with periodic agitation. The monohydrate crystallizes out and the crystals are filtered off and then desiccated under vacuum at ambient temperature. Yield: 890 grams of monohydrate equivalent to 84.6% of theory (1,052 grams of monohydrate).

EXAMPLE II 400 grams of distilled water are poured into a 2 litre balloon flask, heated therein to 60° C. whereupon the flask is placed on a water bath and this temperature maintained during the introduction in small quantities of 510.1 grams of ascorbic acid and 489.9 grams of pyridoxine base. After dissolution has taken place, the product is filtered and then the balloon flask and funnel are washed with 50 ml. of distilled water. The filtrate and the wash waters are mixed in a tray of stainless steel which is placed for a period of 5 hours in a chest at a vacuum of about 40 mm. of mercury at a temperature of 38–40° C. The liquid becomes a mass of crystals and these crystals are dried under a vacuum of 30–40 mm. of mercury at low temperature (25–35° C.). The yield is 1,037 grams of the hydrate equivalent to 98.5% of theory (1,052 grams).

EXAMPLE III

In a 1 litre balloon flask, 26.4 grams (0.15 mol) of ascorbic acid and 25.35 grams (0.15 mol) of pyridoxine base are dissolved in 400 ml. of 95% ethyl alcohol by warming the solution very slightly to facilitate dissolving. The solution is filtered and the filtrate concentrated on a water bath at 30–35° C. under 20 mm. of mercury in such manner as to bring its volume to approximately 50 ml. The thus concentrated filtrate is chilled for several hours. The monohydrate crystallizes out and is separated and washed with the minimum amount of chilled absolute alcohol and dried in a vacuum over phosphorus pentoxide. The yield is 48.1 grams of monohydrate equivalent to 88.3% of theory (54.45 g.).

EXAMPLE IV

Example I is followed, but the crystals of the hydrate after filtering are washed with a very small quantity of chilled absolute alcohol and then dried under vacuum.

The foregoing examples are only intended as illustrative and not as limiting the carrying out of the invention and it is possible for example to use as the reaction medium, in place of the ethanol mentioned in Example III, other organic solvents and particularly other alcohols such as methanol, propanol and isopropanol.

The contents of ascorbic acid and pyridoxine base of the new compound are exceptionally favorable for therapeutic use on account of the respective posologies of these two vitamins. Besides, the monohydrate of the equimolecular complex of ascorbic acid and pyridoxine base is a compound of very low toxicity and possesses the pharmacological properties making it highly valuable for therapy.

Acute toxicity

In the mouse, the LD 50 determined according to Litchfield and Wilcoxon are indicated below with, in parenthesis, limits of 91% confidence:

Oral _____ 8.3 g./kg. (7.90–8.70 g./kg.)
Intravenous _____ 2.1 g./kg. (1.85–2.33 g./kg.)
Intraperitoneal _____ 3.7 g./kg. (3.35–4.05 g./kg.)

In the rat, the LD 50 determined according to Litchfield and Wilcoxon are indicated below with, in parenthesis, limits of 95% confidence:

Oral _____ 5.70 g./kg. (4.79–6.80 g./kg.)
Intraperitoneal _____ 4.90 g./kg. (3.99–5.78 g./kg.)

Chronic toxicity

Daily oral administration to the rat of the compound of the invention during ten consecutive weeks at dosages of 40 mg., 100 mg. and 250 mg./kg. of body weight caused no alteration in the weight curve compared to control animals. No modification of the hematology of the treated animals was apparent. In sacrificed animals at the end of the tests no macroscopic or microscopic changes in the organs were observed. Similar verification was obtained in the rabbit treated for seven weeks orally at the daily dose of 250 mg./kg. of body weight.

Pharmacological properties (a) Antitoxic action.—The monohydrate of the equimolecular complex of ascorbic acid and pyridoxine base significantly lowered ($p$ 0.05) the mortality of animals treated with lethal doses of chloroquine diphosphate (100 mg./kg. intraperitoneally), phenelzine sulfate (200 mg./kg. intraperitoneally), chlorpropamide (125 mg./kg. orally) and primaclone (700 mg./kg.).

(b) Antagonistic action against barbiturates.—The compound of the invention significantly decreased ($p = 0.01$) the duration of experimental sleep caused by sodium hexobarbital and sodium pentobarbital.

Therapeutic properties

The new compound possesses in unforeseen manner antitoxic properties with respect to certain essential chemotherapeutic agents. For example, it has been demonstrated clinically that the compound of the present invention increases in a remarkable manner tolerance to cyclophosphamide, although ascorbic acid and pyridoxine hydrochloride administered individually are without any effect relative to the incidents or accidents caused by this antimitotic.

Use of the new compound of the present invention permits either the resumption of treatments of cyclophosphamide which have been interrupted because of indications of intolerance or the increase of the dosages of the antimitotic to obtain without danger a greater efficacy. In control tests effected by administering either ascorbic acid alone or pyridoxine hydrochloride alone, there has been no appreciable increase caused in the tolerance of the patients to cyclophosphamide.

Similar experiments have been carried out in the treatment of serious incompatibilities to synthetic antimalarials and have established the activity of the present new medication, although ascorbic acid and pyridoxine hydrochloride show ineffectiveness.

Further tests have confirmed the pharmacological statements relative to the very favorable curative and preventive action of the monohydrate of the equimolecular complex of ascorbic acid and pyridoxine base on toxic syndromes resulting from current use of certain other therapeutic medicaments: antidiabetic sulfonamides, barbiturates, anti-epileptics, tuberculostatics (mainly isoniazide) and certain inhibitors of mono-amine oxidase.

The new medicament of the present invention has shown itself very efficacious also in the treatment of asthenia based on various metabolic disturbances. Finally, its activity has been demonstrated on the restless legs syndrome, on muscular cramps such as lumbago and torticolis and on neuritic or polyneuritic disturbances of alcoholic or toxic origin.

The new compound is preferably administered orally in the form of tablets, effervescent tablets, capsules and gelules and liberates its active principle either in the stomach or in the intestines. It is equally well administered in the form of cachets.

All the above pharmaceutical forms contain the monohydrate of the equimolecular complex of ascorbic acid and pyridoxine base either as its sole active ingredient or combined with other medicaments with which it is compatible pharmaceutically and therapeutically.

The invention provides a method of combating toxic syndromes, metabolic disturbances of asthenia, restless leg syndrome, muscular spasms and neuritic and polyneuritic disturbances of toxic or alcoholic origin by administering orally a daily dose of 0.10 to 5 grams of the monohydrate of the equimolecular complex of ascorbic acid and pyridoxine base to human and animal subjects or patients in need of the same.

Below are given non-limitative examples of some pharmaceutical compositions in which the new compound of the invention constitutes the active principle.

Tablets

Monohydrate of the equimolecular complex of ascorbic acid and pyridoxine base, 0.10–1.20 g.
Buffered and flavored excipient enough to make one tablet.

Capsules, gelules, glutubes

Monohydrate of the equimolecular complex of ascorbic acid and pyridoxine base, 0.10–0.60 g.
Buffered excipient sufficient for one capsule or gelule.

Cachets

Monohydrate of the equimolecular complex of ascorbic acid and pyridoxine base, 0.20–0.60 g.
Excipient sufficient for one cachet.

What is claimed is:
1. The stable non-hygroscopic crystalline monohydrate of the equimolecular complex of ascorbic acid and pyridoxine base of melting point 84–85° C.
2. The stable non-hygroscopic crystalline monohydrate of the equimolecular complex of ascorbic acid and pyridoxine base, containing 48.48% of ascorbic acid, 46.56% of pyridoxine base and 4.96% of water of crystallization.
3. A process for the preparation of the stable non-hygroscopic monohydrate of the equimolecular complex of ascorbic acid and pyridoxine base which comprises reacting at mild temperature equimolecular proportions of ascorbic acid and pyridoxine base in water or an organic solvent with sufficient water present for the formation of the monohydrate concentrating the solution at low temperature and at reduced pressure to remove part of the solvent whereby sufficient water remains for the formation of the monohydrate, cooling and recovering therefrom the said monohydrate.
4. A process for the preparation of the stable non-hygroscopic monohydrate of the equimolecular complex of ascorbic acid and pyridoxine base which comprises reacting at mild temperature equimolecular proportions of ascorbic acid and pyridoxine base in ethanol with sufficient water present for the formation of the monohydrate, concentrating the reaction mixture at low temperature under reduced pressure to remove part of the ethanol whereby sufficient water remains for the formation of the monohydrate, cooling and separating the resulting crystals.

References Cited

FOREIGN PATENTS 1,296,524   6/1962   France.

OTHER REFERENCES

Chemical Abstracts: vol. 58, par. 4643–b, 1963.

HENRY R. JILES, Primary Examiner

A. L. ROTMAN, Assistant Examiner

U.S. Cl. X.R.

424—263